United States Patent [19]

Mizukami et al.

[11] Patent Number: 4,705,279
[45] Date of Patent: Nov. 10, 1987

[54] DEVICE FOR CLAMPING A FLEXIBLE DISK

[75] Inventors: Hidetada Mizukami; Tsutomu Urata; Takashi Nakagawa; Kunihiro Hashimoto; Toshiaki Mizoguchi, all of Saitama, Japan

[73] Assignee: Ye Data Inc., Tokyo, Japan

[21] Appl. No.: 878,431

[22] Filed: Jun. 25, 1986

[51] Int. Cl.⁴ ............................................. G11B 25/04
[52] U.S. Cl. .................................... 279/1 L; 346/137; 360/99; 369/261; 369/271
[58] Field of Search ............... 279/1 L, 2 R; 346/137; 360/86, 97–99; 369/261, 270, 271

[56] References Cited

U.S. PATENT DOCUMENTS

| 3,968,972 | 7/1976 | Morgan | 279/1 L X |
| 4,171,531 | 10/1979 | Grapes et al. | 360/99 |
| 4,208,682 | 6/1980 | Bryer | 360/86 X |
| 4,539,614 | 9/1985 | Thompson | 360/86 X |
| 4,575,837 | 3/1986 | Okita | 369/270 |

FOREIGN PATENT DOCUMENTS

| 2927502 | 2/1980 | Fed. Rep. of Germany | 369/261 |
| 51-101117 | 8/1976 | Japan | |
| 58-22318 | 5/1983 | Japan | |

Primary Examiner—Gil Weidenfeld
Assistant Examiner—Steven C. Bishop
Attorney, Agent, or Firm—Wenderoth, Lind & Ponack

[57] ABSTRACT

A collet device for engagement with a spindle hub for clamping a flexible disk between the collet device and the hub, the collet device having a collet having a plurality of radially extending petal-like portions therearound, a collet shaft on which the collet is mounted, a regulating body on the collet and having stops thereon extending outside the ends of the petal-like portions and engagable by the ends of the petal-like portions for limiting the outward movement of the petal-like portions during an increase in the diameter of the collet, and an enlarging spring on the regulating body have legs thereon engaging the ends of the petal-like portions for urging the ends of the petal-like portions outwardly for increasing the diameter of the collet.

3 Claims, 7 Drawing Figures

DEVICE FOR CLAMPING A FLEXIBLE DISK

The present invention relates to a device for clamping a flexible disk in a flexible disk driving apparatus.

BACKGROUND OF THE INVENTION AND PRIOR ART

In the past, a flexible disk clamping device for use in a flexible disk driving apparatus and as shown in FIGS. 1 and 2 has been available.

In the clamping device shown in FIG. 1, a collet 1 is pivotally mounted on a collet shaft 3, said collet 1 being provided with a suitable number of slits 2 in a cover-like body having a flange and being formed in the form of a petal. The collet shaft 3 is moved down to clamp the inner peripheral edge of a disk 5 between the peripheral edge 4a of a spindle hub 4 and a flange on the collet 1.

However, the prior art clamping device shown in FIG. 1 is designed so that the outside diameter of the collet 1 is larger than the inside diameter of the spindle hub 4, and therefore, the device suffers from such disadvantages as that when clamping, the collet may not be forced into the hub completely and may run on to the hub, thus damaging the center of the flexible disk 5 and impairing the normal rotation thereof.

The clamping device shown in FIG. 2 is designed so that a petal-like collet 6, similar to the collet shown in FIG. 1, is turned over and pivotally mounted on a collet shaft 7 so that it is axially slidable. A wedge board 9 is mounted on a bearing 8 on the collet shaft 7, and a biasing spring 10 is provided between the wedge board 9 and the collet 6.

Also in the clamping device, the collet shaft 7 is moved down, the outside diameter of the collet is increased by the wedge board 9, and the flexible disk 5 is clamped between the peripheral edge 4a of the spindle hub 4 and the flange 6a of the collet 6 in a manner similar to that shown in FIG. 1. This device also has disadvantages, such that the outside diameter of the collet 6 cannot reach a desired size if there is an error in manufacture, a temperature change, or a change of size after passage of time. Thus a clearance may be formed between the center hole of the flexible disk 5 and the collet 6, and the center of the flexible disk shifts away from the center rotation.

When the center of the flexible disk is offset relative to the center of rotation as described above, a so-called head deviation occurs during write-in and read-out, significantly influencing the performance of a read/write device using the flexible disk. The greater the write-in density, the greater the bad influence due to the offset.

OBJECT AND BRIEF SUMMARY OF THE INVENTION

The present invention has been made to overcome the problems noted above with respect to the prior art devices. It is an object of the invention to provide a clamping device which can prevent the center of the flexible disk from becoming eccentric relative to the shaft.

As a result of various studies, the present inventors have found that the cause of occurrence of a deviation of the center of a flexible disk held in these prior art clamping devices is due to the smaller outside diameter $D_C$ of the collet than to the inside diameter $D_H$ of the spindle hub. The above-described problem of deviation of the center of the disk has been solved by the provision of an arrangement wherein an enlarging spring is provided to enlarge the outside diameter of the petal portion of the collet, and stops for regulating the allowable maximum outside diameter of the collet are provided to eliminate the run-on of the collet onto the hub.

BRIEF DESCRIPTION OF THE DRAWINGS

One example of an embodiment of the present invention will be described with reference to the accompanying drawings, in which.

DETAILED DESCRIPTION OF THE INVENTION

Figure 1:
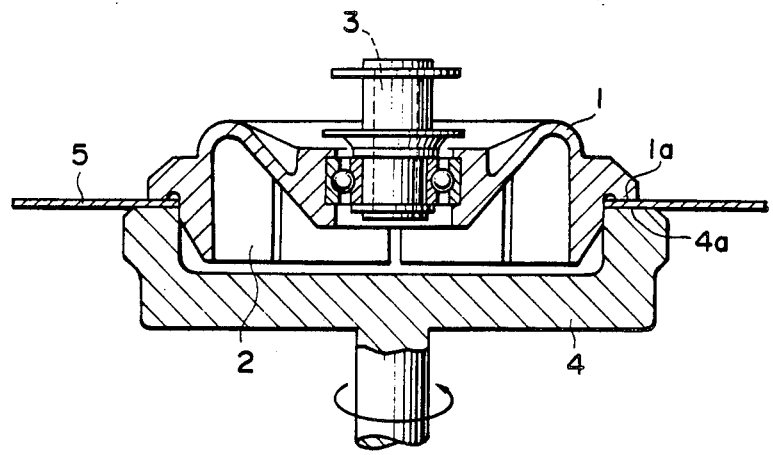
FIG. 1 is a longitudinal sectional view of a conventional disk clamping device.
Figure 2:
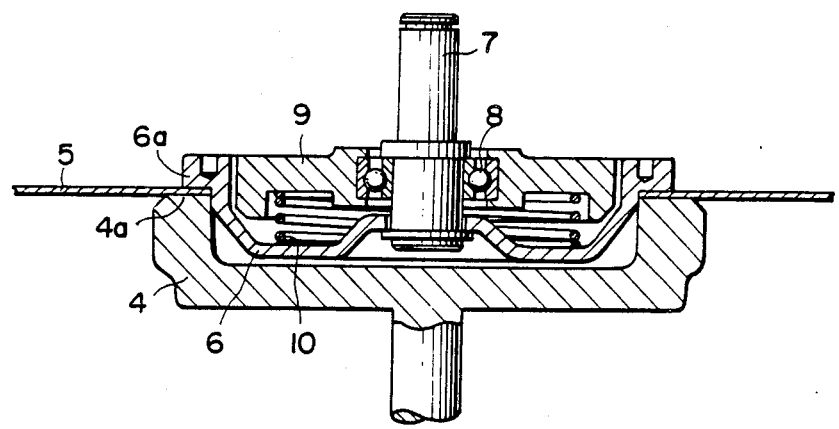
FIG. 2 is a longitudinal sectional view of a further conventional disk clamping device.
Figure 3:
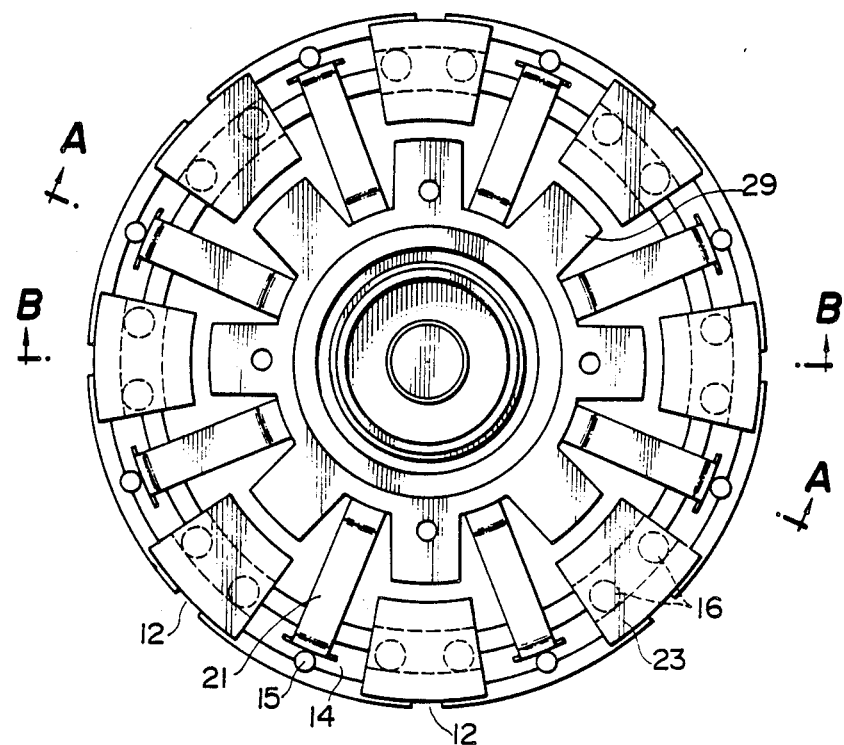
FIG. 3 is a plan view of one embodiment of a disk clamping device according to the present invention.
Figure 4:
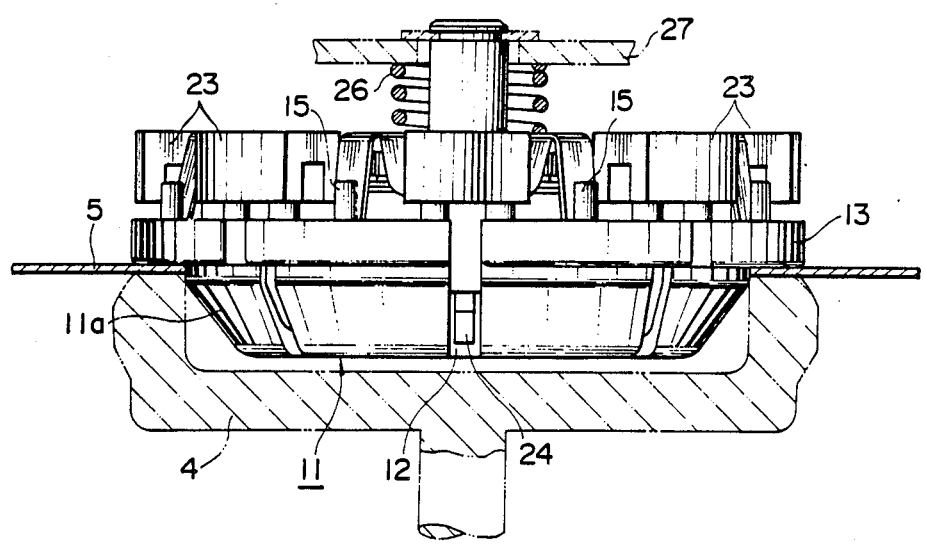
FIG. 4 is a side elevation view of the embodiment shown in FIG. 3.
Figure 5:
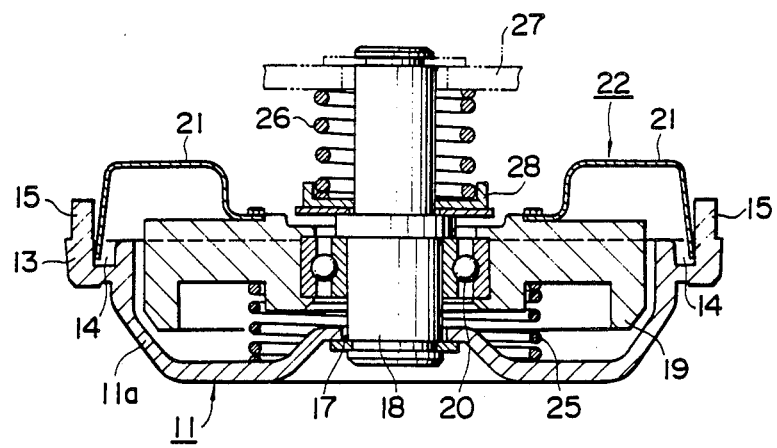
FIG. 5 is a sectional view taken on line A—A of FIG. 3.
Figure 6:
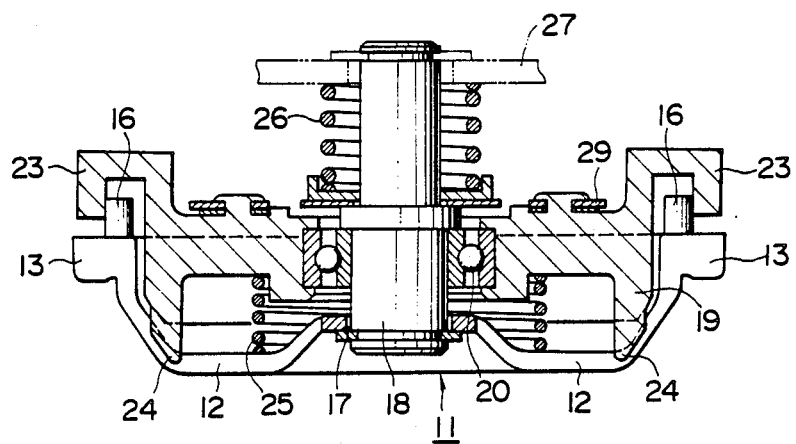
FIG. 6 is a sectional view taken on line B—B of FIG. 3.
Figure 7:
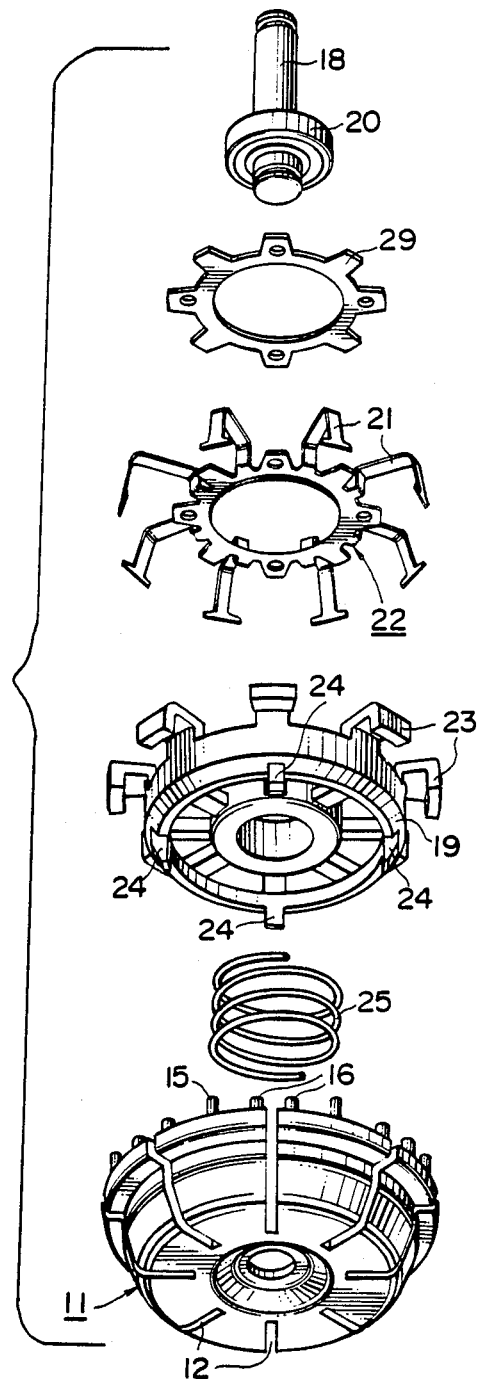
FIG. 7 is an exploded perspective view of the embodiment of the disk clamping device according to the present invention.

In the drawings, reference numeral 11 designates a petal-like collet with eight radial slits 12 defining petal portions 11a therebetween. On a flange 13 of each petal portion 11a is provided an enlarging spring-engaging recess 14 which will be described later, a circular cylindrical projection 15 and a stop-engaging circular cylindrical projection 16. A center hole 17 is provided by which the collet is mounted on a collet shaft 18 for sliding movement thereon for a few millimeters in the axial direction of the shaft 18.

Reference numeral 19 designates a regulating member mounted on the collet shaft 18 by means of a bearing 20. An octopus leg-like enlarging spring 22 is mounted on the top of regulating member 19 and has legs 21 the free ends of which are inserted into the recesses 14 and engage the sides of the circular cylindrical projections 15. Eight hook-like stops 23 are provided on the peripheral edge of the member 19 and engage the outside of the projections 16.

Four integral rotating projections 24 extend downwardly from the under side of member 19 into engagement with the slits 12 of the collet 11.

Reference numeral 25 designates a collet-biasing spring provided between the collet 11 and the regulating member 19, and reference numeral 26 designates a collet shaft-biasing spring provided between an oscillating arm 27 of a disk driving apparatus and a washer with a flange and which is against spring disk 29 resting on a flange (unnumbered) on shaft 18.

In the collet 11 of the present invention, the petal portions 11a are pressed by means of the enlarging spring 22 so that the outside periphery of the collet is always urged outwardly to increase the diameter. However, the collet has a construction such that the maximum outside diameter of the collet is regulated by the stops 23, and therefore, the maximum outside diameter of the collet is never reduced due to the temperature, change after passage of time and the like, thus avoiding the occurrence of a deviation of the position of the center of the flexible disk being clamped.

Moreover, since the outside diameter of the collet is limited by the stops 23, bite-in of the flexible disk resulting from over-enlargement of the outside diameter of the collet can be prevented.

While in the illustrated embodiment, the regulating member 19 has been formed separately from the collet 11, it is to be noted that the member can be formed integrally with the collet.

In addition, while in the illustrated embodiment, portions in contact with the legs 21 of the enlarging spring 22 and portions in contact with the stops 23 have been formed as circular cylindrical projections 15 and 16, respectively, it is to be noted of course that if materials which are well slipped are used, constructions other than that described above can be employed.

What is claimed is:

1. A collet means for engagement with a spindle hub for centering and clamping an annular flexible disk on the spindle hub, said collet means comprising:
    a collet having a plurality of radially extending petal-like portions therearound for centering the annular disk on the spindle hub when the collet means engages the spindle hub, each of said petal-like portions having a flange integral therewith for pressing a surface portion of the annular disk against the spindle hub to clamp the annular disk when the collet means engages the spindle hub, and each of said petal-like portions having a first stop portion integral therewith and extending therefrom;
    a collet shaft on which said collet is mounted;
    a regulating body on said collet and having stops thereon extending outside of said first stop portions of said petal-like portions and engagable by said first stop portions for limiting the outward movement of said petal-like portions during an increase in the diameter of said collet; and
    an enlarging spring on said regulating body and having legs thereon engaging said petal-like portions for urging said petal-like portions outwardly for increasing the diameter of said collet.

2. A collet means as claimed in claim 1,
    wherein each of said petal-like portions further has a second stop portion integral therewith and spaced outwardly therefrom so as to define a recess therebetween, and said legs of said engaging spring respectively extend into the recesses and against said second stop portions for urging said petal-like portions outwardly.

3. A collet means as claimed in claim 1,
    wherein said stops of said regulating body extend downwardly outside said first stop portions of said petal-like portions.

* * * * *